(No Model.)

N. RICHARDSON.
STEERING MECHANISM.

No. 258,809. Patented May 30, 1882.

Witnesses.
H. H. Blanchard
A. L. White

Inventor
N. Richardson
by Wright & Brown
Attys ized.

UNITED STATES PATENT OFFICE.

NATHAN RICHARDSON, OF GLOUCESTER, MASSACHUSETTS.

STEERING MECHANISM.

SPECIFICATION forming part of Letters Patent No. 258,809, dated May 30, 1882.

Application filed February 4, 1882. (No model.)

*To all whom it may concern:*

Be it known that I, NATHAN RICHARDSON, of Gloucester, in the county of Essex and State of Massachusetts, have invented certain Improvements in Steering Mechanism, of which the following is a specification.

This invention relates to that class of steering apparatus in which a right and left hand screw-shaft is employed to move two nuts simultaneously in opposite directions, said nuts being connected with the rudder-head, so as to rotate the latter when they are moved by the screw-shaft.

The invention has for its object to provide certain improvements in the construction of steering mechanism of this class, which I will now proceed to describe and claim.

Figure 1:
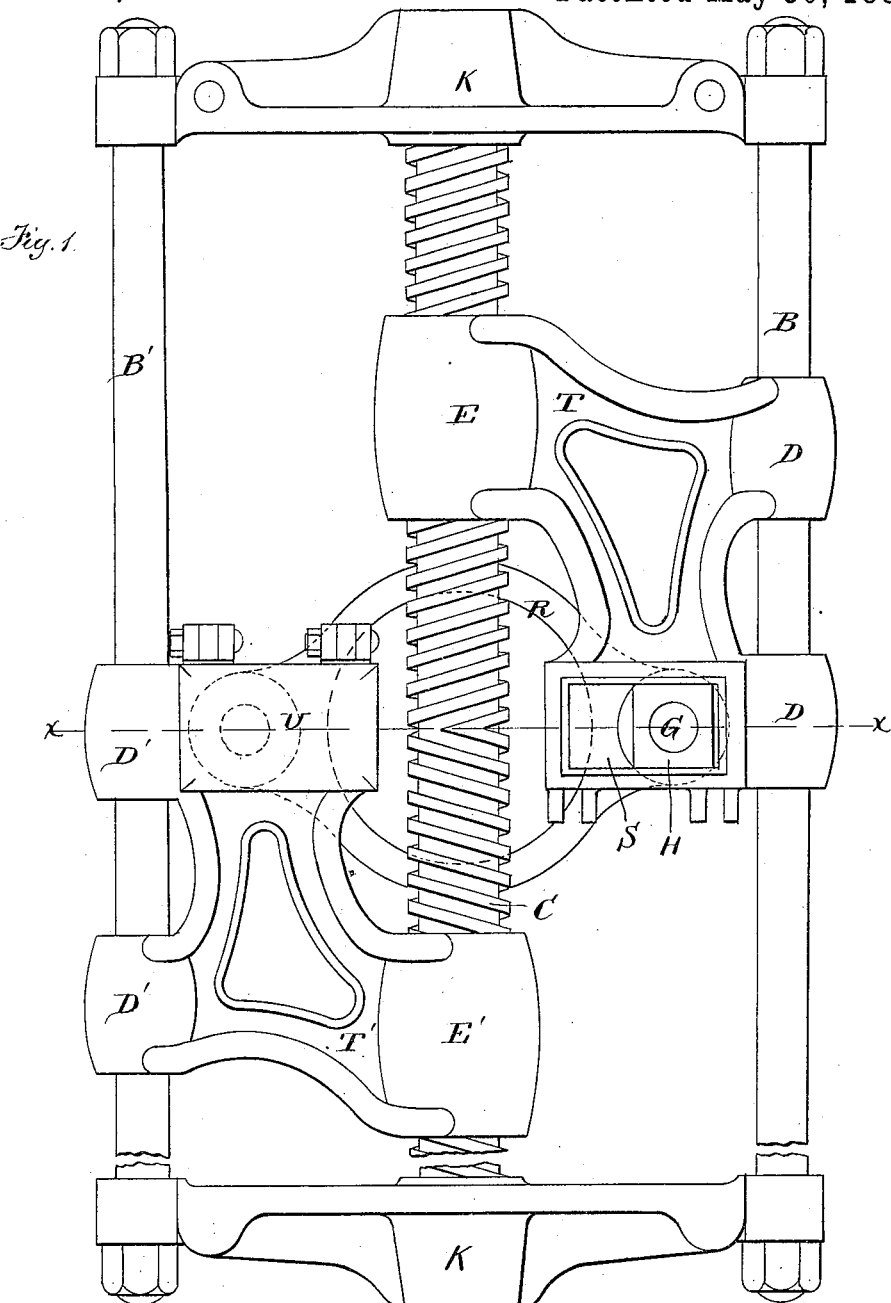
Figure 2:
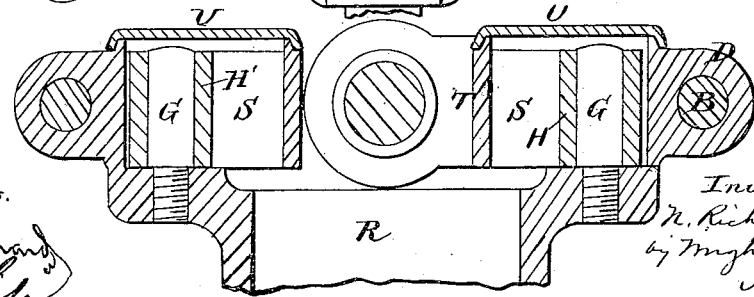

Of the accompanying drawings, forming a part of this specification, Figure 1 represents a top view of a steering mechanism embodying my invention. Fig. 2 represents a vertical section on line *x x*, Fig. 1.

The same letters of reference indicate the same parts in all the figures.

In the drawings, C represents a right and left hand screw-shaft, journaled in suitable supports, K K, which are attached to the deck of the vessel and provided with a hand-wheel, whereby it may be rotated.

E E' represent nuts placed respectively upon the right and left hand threads of the shaft C, so that when the shaft is rotated the nuts will be moved simultaneously toward or from each other, according to the direction of the rotation of the shaft.

B B' represent guide-rods rigidly attached to the supports K K and located on opposite sides of the screw-shaft C, parallel with said shaft.

To the nut E is rigidly attached an L-shaped arm, T, which extends outwardly to the rod B and diagonally to a point over one side of the rudder-head R, where it is engaged with said rudder-head, as hereinafter described, thus securing widely separated or extended bearings D D, adapted to slide on the guide-rod B, said bearings fitting upon said rod so they cannot wabble thereon. The nut E, arm T, and bearings D D are rigidly connected to each other, and are all preferably cast or formed in a single piece. The arm T is provided with a slot, S, which receives a rectangular slide, H, journaled on a pivot or journal, G, which projects upwardly from a boss or arm on one side of the rudder-head R.

U represents a cover hinged to the arm T and adapted to prevent the access of salt-water, dust, and dirt to the bearing-surfaces of the slot S and slide H.

The nut E' is provided with an L-shaped arm, T', having bearings D' D', like the bearings D D, and sliding on the guide-rod B'. The arm T' is a duplicate in all respects of the arm T, and its slot S receives a block, H', journaled to an arm or boss on the opposite side of the rudder-head from the block H.

When the screw-shaft C is rotated the movement of the nuts E E' effected thereby causes the rudder-head R to rotate, the slides H H' moving in the slots S S during the movement of the blocks and rotation of the rudder-head.

By using arms T of the L shape shown I secure wide bearings on the guides, and can yet bring the nuts E close to the center of the screw. The arm is thus prevented from canting and binding the nut on the screw without unduly lengthening the nut, which would necessitate a long screw to secure the proper degree of motion.

I do not claim broadly the combination of the rudder-head and slides connected thereto and moved in opposite directions by a right-and-left screw; but

I claim—

The combination, with a rudder-head having arms carrying journals G, of a frame consisting of cross-heads K K and guides B B, a right-and-left screw, C, turning in the cross-heads, and L-shaped arms T, slotted to receive the journals, bearing with their long arms on and sliding on the guides B B, and formed into nuts receiving the screw at the ends of their inner arms, as specified.

In testimony whereof I have signed my name to this specification, in the presence of two subscribing witnesses, this 28th day of January, 1882.

NATHAN RICHARDSON.

Witnesses:
H. C. HUBBARD,
JOSIAH OBEAR.